(12) United States Patent
Griffiths

(10) Patent No.: US 6,246,027 B1
(45) Date of Patent: Jun. 12, 2001

(54) ELECTRICALLY HEATED TOOL FOR CUTTING HAIR

(76) Inventor: Vivette Griffiths, 86-76 208 St. #1 C, Queens Village, NY (US) 11427

( * ) Notice: Subject to any disclaimer, the term of this patent is extended or adjusted under 35 U.S.C. 154(b) by 0 days.

(21) Appl. No.: 09/428,889

(22) Filed: Oct. 28, 1999

(51) Int. Cl.[7] .................................................. H05B 3/00
(52) U.S. Cl. ........................ 219/222; 219/243; 219/524; 30/140; 30/193; 132/269
(58) Field of Search ................... 219/225, 223, 219/222, 226, 228, 243, 533, 524; 30/140, 321, 330, 331, 193; 132/269, 224, 225; 156/583.9, 515, 251; 83/170–171, 15–16

(56) References Cited

U.S. PATENT DOCUMENTS

| D. 132,140 | 4/1942 | Schlicker . | |
|---|---|---|---|
| 1,532,610 | 4/1925 | Taylor . | |
| 2,343,117 | * 2/1944 | Vincent | 156/515 |
| 3,015,600 | * 1/1962 | Cook | 156/515 |
| 3,035,381 | * 5/1962 | Hosso | 156/515 |
| 3,047,991 | * 8/1962 | Siegel et al. | 156/515 |
| 3,214,317 | * 10/1965 | Rucker et al. | 156/515 |
| 3,474,224 | 10/1969 | Carter . | |
| 3,624,349 | * 11/1971 | Mayer | 219/243 |
| 3,912,575 | * 10/1975 | Zelnick | 156/515 |
| 3,934,115 | 1/1976 | Peterson . | |
| 5,142,123 | * 8/1992 | Chou | 219/243 |
| 5,309,640 | 5/1994 | Caron . | |
| 5,472,654 | 12/1995 | Crawford . | |
| 5,854,466 | * 12/1998 | Chou | 219/227 |

FOREIGN PATENT DOCUMENTS

| 264471 | * 1/1950 | (FR) | 219/243 |
|---|---|---|---|
| 577602 | * 6/1958 | (IT) | 83/171 |
| 86286 | * 9/1957 | (NL) | 219/243 |

* cited by examiner

*Primary Examiner*—John A. Jeffery

(57) ABSTRACT

A tool for cutting synthetic hair that is for sealing synthetic hair when synthetic hair is braided and cut to length. The tool for cutting synthetic hair includes a top portion containing a cutting blade and a bottom portion containing an electric heating element. An electrical cord extends into the bottom portion connecting a switch to the heating element. A hinge connects the top and bottom portions. The top portion is urged away from the bottom portion by a spring. Synthetic hair is placed between the top and bottom portions. When the cutting blade is brought in contact with the heating element, the synthetic hair is cut and sealed.

16 Claims, 2 Drawing Sheets

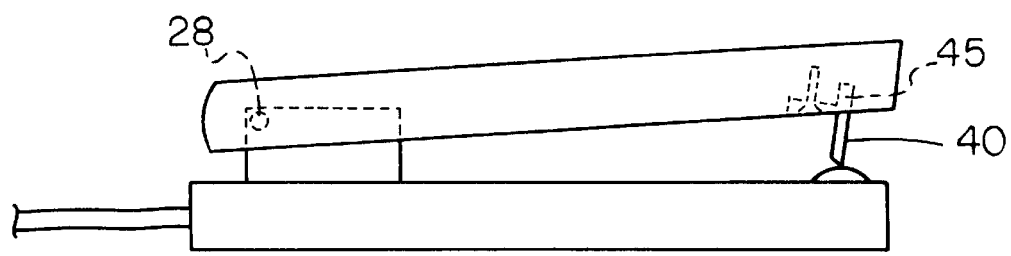
FIG. 3
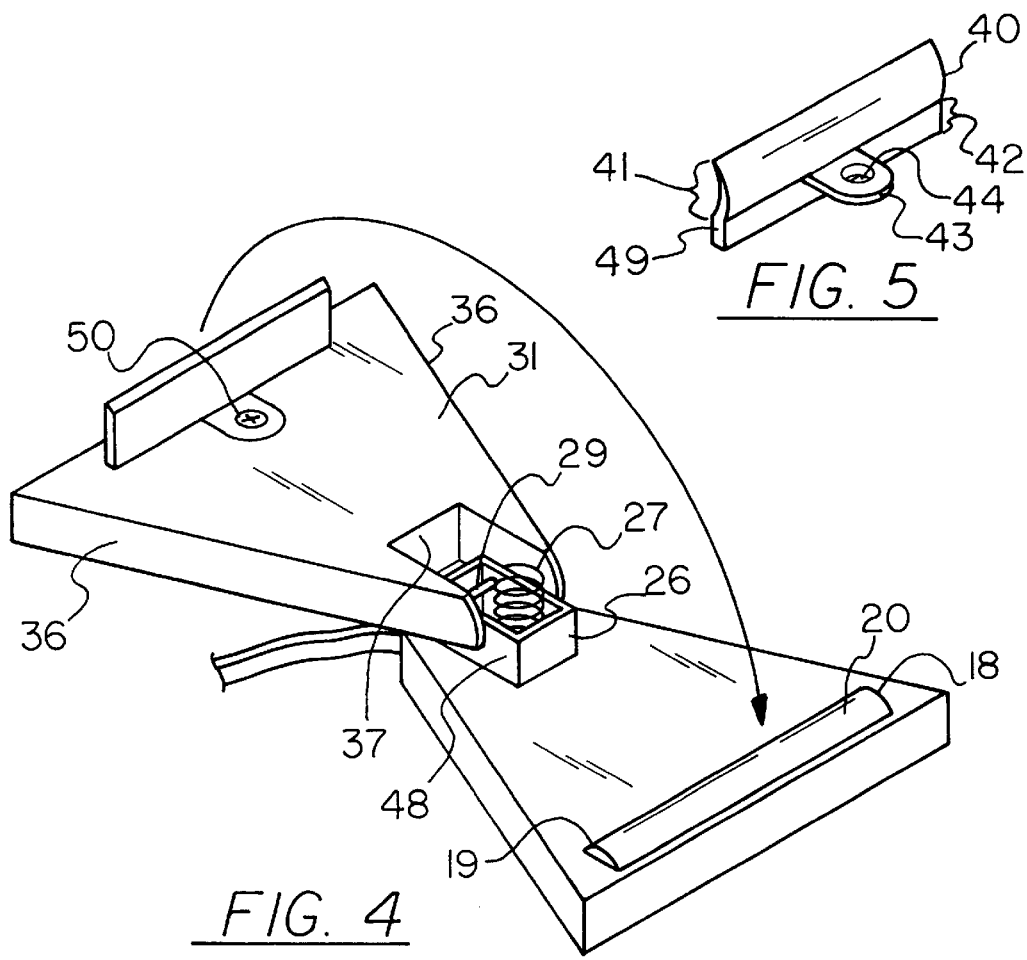
FIG. 5
FIG. 4

ELECTRICALLY HEATED TOOL FOR CUTTING HAIR

BACKGROUND OF THE INVENTION

1. Field of the Invention

The present invention relates to synthetic fiber cutting tools and more particularly pertains to a new tool for sealing synthetic hair when it is braided.

2. Description of the Prior Art

The use of synthetic fiber cutting tools is known in the prior art. More specifically, synthetic fiber cutting tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,472,654; U.S. Pat. No. 3,934,115; U.S. Pat. No. 5,309,640; U.S. Pat. No. 3,474,224; U.S. Pat. Des. No. 132,140; and U.S. Pat. No. 1,532,610.

While these devices fulfill their respective, particular objectives and requirements, the aforementioned patents do not disclose a new tool for cutting synthetic hair. The inventive device includes an electric heating element and cutting blade which cuts and seals the hair in one step.

In these respects, the tool for cutting synthetic hair according to the present invention substantially departs from the conventional concepts and designs of the prior art, and in so doing provides an apparatus primarily developed for the purpose of sealing synthetic hair when it is braided.

SUMMARY OF THE INVENTION

In view of the foregoing disadvantages inherent in the known types of synthetic fiber cutting tools now present in the prior art, the present invention provides a new tool for cutting synthetic hair construction wherein the same can be utilized for sealing synthetic hair when it is braided.

The general purpose of the present invention, which will be described subsequently in greater detail, is to provide a new tool for cutting synthetic hair apparatus and method which has many of the advantages of the synthetic fiber cutting tools mentioned heretofore and many novel features that result in a new tool for cutting synthetic hair which is not anticipated, rendered obvious, suggested, or even implied by any of the prior art synthetic fiber cutting tools, either alone or in any combination thereof.

To attain this, the present invention generally comprises a bottom member having a first side, a second side, a third side, a forth side, a top surface and a bottom surface. The first and third sides are parallel to each other. The bottom member has a periphery defined by the area between the top and bottom surfaces.

A heating element having a length, a width and a height such that the length is substantially greater than the width and the height. The heating element is mounted in the bottom member such that its length is adjacent and parallel to the first side of the bottom member.

An electrical power switch is located between the top and bottom portions of the bottom member. An electrical cord having wires extending through the periphery of the bottom member such the heating element and the switch are connected together.

A hinge mechanism attached to the bottom member on the top portion thereof wherein the hinge mechanism has a direction of operation parallel to the first side of the bottom member.

A top member having a first side, a second side, a third side, a forth side, a top surface and a bottom surface. The first and third sides are parallel to each other. The bottom member has a periphery defined by the area between the top and bottom surfaces.

The top member forms generally the same shape as the bottom member. The top member has a notch removed from the bottom portion adjacent to the first end. The notch has a length, width and depth such that it can house the hinge mechanism.

The top member is attached to the bottom member by the hinge mechanism such that the bottom surface of the top member covers and is generally aligned with the top portion of bottom member.

A metallic blade is removably attached to the bottom surface of the top member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tool for cutting synthetic hair apparatus and method which has many of the advantages of the synthetic fiber cutting tools mentioned heretofore and many novel features that result in a new tool for cutting synthetic hair which is not anticipated, rendered obvious, suggested, or even implied by any of the prior art synthetic fiber cutting tools, either alone or in any combination thereof.

It is another object of the present invention to provide a new tool for cutting synthetic hair which may be easily and efficiently manufactured and marketed.

It is a further object of the present invention to provide a new tool for cutting synthetic hair which is of a durable and reliable construction.

An even further object of the present invention is to provide a new tool for cutting synthetic hair which is susceptible of a low cost of manufacture with regard to both materials and labor, and which accordingly is then susceptible of low prices of sale to the consuming public, thereby making such tool for cutting synthetic hair economically available to the buying public.

Still yet another object of the present invention is to provide a new tool for cutting synthetic hair which provides in the apparatuses and methods of the prior art some of the advantages thereof, while simultaneously overcoming some of the disadvantages normally associated therewith.

Still another object of the present invention is to provide a new tool for cutting synthetic hair for sealing synthetic hair when it is braided.

Yet another object of the present invention is to provide a new tool for cutting synthetic hair which includes a one step method of cutting and sealing the synthetic hair.

Still yet another object of the present invention is to provide a new tool for cutting synthetic hair that avoid the use of open flames and candles which are a prevalent method of sealing synthetic hairs. The use of open flame is dangerous, time consuming and often inaccurate.

Even still another object of the present invention is to provide a new tool for cutting synthetic hair that will fulfill the needs of many professional hairdressers who currently lack such a tool.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic cross sectional view of the top portion of the present invention.

FIG. 4 is a schematic perspective view of the blade member for the present invention.

FIG. 5 is a schematic perspective view of the present invention displaying the hinge mechanism.

DESCRIPTION OF THE PREFERRED EMBODIMENT

Figure 1:
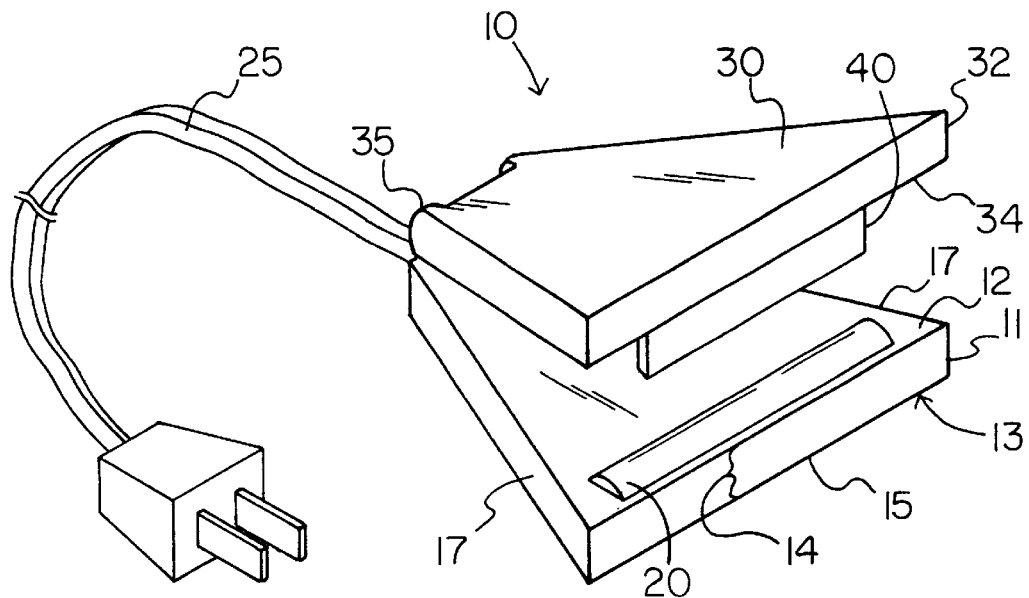
FIG. 1 is a schematic perspective view of a new tool for cutting synthetic hair according to the present invention.
Figure 2:
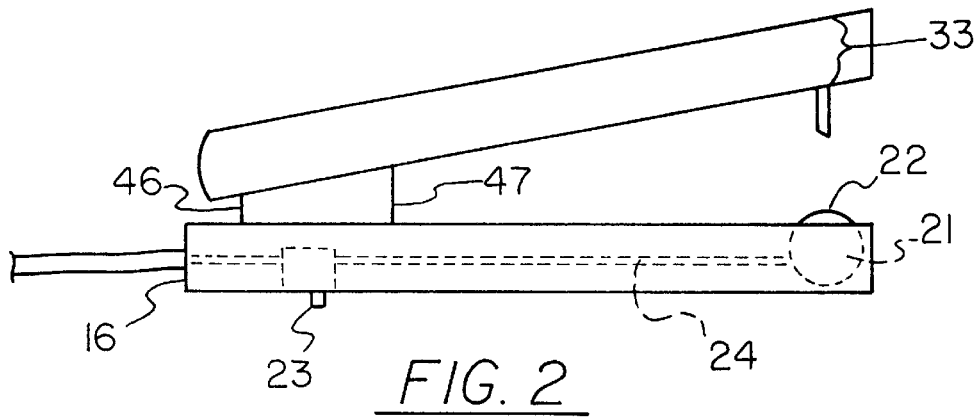
FIG. 2 is a schematic cross sectional view of the bottom portion of the present invention.

With reference now to the drawings, and in particular to FIGS. 1 through 6 thereof, a new tool for cutting synthetic hair embodying the principles and concepts of the present invention and generally designated by the reference numeral 10 will be described.

As best illustrated in FIGS. 1 through 6, the tool for cutting synthetic hair 10 generally comprises a bottom member 11 having a top surface 12 and a bottom surface 13 of equal dimensions. Vertical walls or sides 14 defining a periphery between the top and bottom portions and connect the top and bottom portions.

Preferably, the bottom member forms a trapezoid having a first end 15 and a second end 16 oriented parallel to each other. the bottom member has a line of symmetry perpendicular to these ends 15, 16. The first end is shorter in length than the second end. The bottom member has two sides 17 of a length such that they are longer than the second end.

The bottom member contains a heating element 20 having first 18 and second 19 circular ends. The ends are connected by a cylindrical wall. The heating element is mounted in the bottom member adjacent and parallel to the second end of the bottom member. Preferably, the heating element has a horizontal diameter 21 located below the top surface of bottom member such that an arc 22 of less than 180 degrees of the element is exposed above the plane of the top surface.

An electrical power switch is located in the periphery of the bottom member preferably such that the switch 23 extends downwardly out from the bottom portion of bottom member.

An electrical cord 25 has wires 24 entering through the first end of the bottom member. The wires are connected to the switch and extend to the heating element.

A hinge mechanism formed by a rectangular box 26 has a bottom panel and two pair of opposite, parallel walls. The walls extend upwardly equidistantly from bottom panel and define a space therebetween. A first pair of the parallel walls forms a separate distal 47 and proximate wall 46. A second pair of walls 48 is perpendicularly adjacent to the first pair. The box is open from the top. The rectangular box is attached by a fastening means to the bottom member adjacent to first end 16 such that the proximate wall 46 is parallel and adjacent to the bottom member first end 16. The box can be fastened by any of the known methods including but not limited to soldering, gluing and fasteners. The box should be located such that the combination of box and bottom member retains one line of symmetry perpendicular to the ends of the bottom member.

A spring 27 is attached by a fastening means to the bottom portion of the box. The spring is to be located within the box adjacent to the distal box wall 47. The spring extends upwardly beyond height of the box.

Two bores 28 are diametrically located in the walls of the box perpendicular to the proximate wall. The bores are located adjacent to the proximate wall at upper most portion of connection between the proximate wall and the perpendicular walls.

A hinge extends between and beyond the bores 29.

A top member 32 has a top surface 30 and a bottom surface 31 of equal dimensions. The top and bottom surfaces connected by vertical walls 33 to define a periphery of the top member therebetween.

Preferably, the top member forms a trapezoid having a first end 34 and a second end 35 parallel to each other. The top member has a line of symmetry perpendicular to the ends. The first end is shorter in length than the second end.

The top member has two sides 36 of a length such that they are longer than the second end. The top member has dimensions identical to bottom member. The top member has a first notch 37 removed from the bottom portion adjacent to the first end. The first notch will have a length and width slightly longer than the box. The first notch will have a depth so as to leave the top portion intact, the first notch will receive the box when the top member is placed over the bottom member.

A pair of bores 28 in the first notch are diametrically opposed to each other and positioned to receive the hinge such that the top member is connected to the box. The box fits within the first notch and the spring urges the second end of top member away from the second end of bottom member.

A metallic blade 40 member comprises a blade of length substantially greater than its height. The blade has a base portion 49 and sharpened portion 41. An anchor portion 42 has a rectangular configuration with a length identical to the length of the blade, height approximately one half of the height of the top member, and width equal to the base of the blade. The anchor is in fluid connection to the base of blade. A tab 44 extends from juncture of the base and the anchor and has a bore therethough 43 for receiving a screw.

A second notch 45 removed from the bottom surface of top member adjacent to the second end of top member. The second notch has a length, width and depth of equal proportions to the anchor. The second notch is to be placed such that insertion of the blade member allows the blade to come in contact with the heating element when the top member is forced downward against the spring.

In use, the hairdresser or other person turns on the heating element using the switch 23. When the element 20 is hot, the user grabs a braided section of synthetic hair and places it between the element and the blade 40. The top 32 and bottom 11 members remain apart because of the spring 27 located between them. The user presses down on the top member so that the blade comes in contact with the heating element. The synthetic hair is cut and heat sealed in one step. When the blade becomes dull, it can be replaced by removing the screw 50 holding it in and replacing it with another blade.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electric synthetic hair cutting and sealing tool comprising:
   a bottom member having a first side, a second side, a third side, a fourth side, a top surface and a bottom surface, said first and third sides being parallel to each other, said bottom member having a periphery defined by the area between said top and bottom surfaces;
   a heating element having a length, a width and a height such that the length is substantially greater than the width and the height;
   said heating element being mounted in said bottom member such that its length is adjacent and parallel to said first side of said bottom member;
   an electrical power switch being located between said top and bottom portions of said bottom member;
   an electrical cord having wires extending through said periphery of said bottom member such said heating element and said switch are connected together;
   a hinge mechanism attached to said bottom member on said top portion thereof wherein said hinge mechanism has a direction of operation parallel to said first side of said bottom member;
   a top member having a first side, a second side, a third side, a forth side, a top surface and a bottom surface, said first and third sides being parallel to each other, said bottom member having a periphery defined by the area between said top and bottom surfaces;
   said top member forming generally the same shape as said bottom member;
   said top member having a notch removed from said bottom portion adjacent to said first end, said notch having a length, width and depth such that it can house said hinge mechanism;
   said top member attached to said bottom member by said hinge mechanism such that said bottom surface of said top member covers and is generally aligned with said top portion of bottom member;
   a metallic blade removably attached to said bottom surface of said top member.

2. A synthetic hair cutter and sealer as set forth in claim 1 and further including said bottom member forming a trapezoid having a having a line of symmetry perpendicular to said first and third sides, said first side being shorter in length than said third side.

3. A synthetic hair cutter and sealer as set forth in claim 2 wherein said second and forth sides of said bottom member have a length greater than said third side.

4. A synthetic hair cutter and sealer as set forth in claim 3 wherein said blade comprises:
   a blade which has a length substantially greater than its height, said blade having a base portion and sharpened portion;
   an anchor portion being a rectangular configuration with a length identical to the length of said blade, height approximately one half of the height of said top member, and width equal to the said base of blade, said anchor being in fluid connection to said base of blade.

5. A synthetic hair cutter and sealer as set forth in claim 4 further comprising a tab extending from juncture of said base and said anchor, said tab having a bore therethough for receiving a screw.

6. A synthetic hair cutter and sealer as set forth in claim 4 further comprising a second notch removed from said bottom surface of said top member adjacent to said third side of said top member, said second notch having a length, width and depth of equal proportions to said anchor; said second notch located adjacent and parallel to said third side of said top member.

7. A synthetic hair cutter and sealer as set forth in claim 2 wherein said hinge mechanism comprises a rectangular box having a bottom panel, and two pair of opposite, parallel walls.

8. A synthetic hair cutter and sealer as set forth in claim 7 wherein said hinge mechanism is attached by a fastening means to said first side of said bottom member.

9. A synthetic hair cutter and sealer as set forth in claim 8 wherein said hinge mechanism is located such that the combination of said box and said bottom member retain one line of symmetry perpendicular to said first and third sides of said bottom member and one set of parallel walls of said box are parallel to said first side of said bottom member.

10. A synthetic hair cutter and sealer as set forth in claim 9 wherein a spring being attached by a fastening means to said bottom portion of said box.

11. A synthetic hair cutter and sealer as set forth in claim 10 wherein said box contains two bores diametrically located in said walls perpendicular to said first side of said bottom member.

12. A synthetic hair cutter and sealer as set forth in claim 11 further comprising a hinge extending between and beyond said bores.

13. A synthetic hair cutter and sealer as set forth in claim 12 further comprising a pair of bores in said notch diametrically opposed to each other and positioned to receive said hinge such that said top member is connected to said box, such that said box fits within said first notch and such that said spring urges said second end of top member away from said second end of bottom member.

14. A synthetic hair cutter and sealer as set for in claim 1 and further including a heating element having a first and second circular ends, said ends being connected forming a cylindrical wall.

15. A synthetic hair cutter and sealer as set forth in claim 1 and further comprising said switch wherein said switch extends downwardly out from said bottom surface of said bottom member.

16. An electric synthetic hair cutting and sealing tool comprising:
  a bottom member having a top surface and a bottom surface of equal dimensions, said top and bottom surfaces connected by vertical walls to define a periphery therebetween;
  said bottom member forming a trapezoid having a first end and a second end oriented parallel to each other, said bottom member having a line of symmetry perpendicular to said ends, said first end being shorter in length than said second end;
  said bottom member having two sides of a length such that they are longer than said second end;
  a heating element having a first and second circular ends, said ends are connected by a cylindrical wall;
  said heating element being mounted in said bottom member adjacent and parallel to second end of said bottom member, said heating element having a horizontal diameter located below said top portion of bottom member such that an arc of less than 180 degrees of the said element is exposed above the plain of said top portion;
  an electrical power switch being located in said periphery of said bottom member such that said switch extends downwardly out from said bottom portion of bottom member;
  an electrical cord having wires bore through said first end of said bottom member, said wires being connected to said switch and extending to said heating element;
  a rectangular box having a bottom panel, and two pair of opposite, parallel walls, said walls extending upwardly equidistantly from bottom panel defining a space therebetween, a first pair of said parallel walls forming a separate distal and proximate wall, a second pair of said walls perpendicularly adjacent to said first pair;
  said box having an open top portion opposite of said bottom panel;
  said rectangular box attached by a fastening means to said bottom member adjacent to first end such that said proximate wall is parallel and adjacent to said bottom member first end, said box being located such that the combination of box and bottom member retain one line of symmetry perpendicular to said ends of said bottom member;
  a spring attached by a fastening means to said bottom portion of said box, said spring to be located in said box adjacent to said distal box wall, said spring extending upwardly beyond a height of said box;
  two bores diametrically located in said walls perpendicular to proximate wall, said bores being located adjacent to said proximate wall at upper most portion of connection between said proximate wall and said perpendicular walls;
  a hinge extending between and beyond said bores;
  a top member having a top surface and a bottom surface of equal dimensions, said top and bottom surfaces connected by vertical walls to define a periphery therebetween;
  said top member forming a trapezoid having a first end and a second end parallel to each other, said top member having a line of symmetry perpendicular to said ends, said first end being shorter in length than said second end;
  said top member having two sides of a length such that they are longer than said second end;
  said top member having dimensions identical to said bottom member, said top member having a first notch removed from said bottom surface adjacent to said first end, said first notch having a length and width slightly longer than said box, said first notch having a depth so as to leave the top portion intact, said first notch receiving said box when said top member is placed over said bottom member;
  a pair of bores in said first notch diametrically opposed to each other, said pair of bores being positioned to receive said hinge such that said top member is connected to said box, such that said box fits in said first notch and such that said spring urges said second end of said top member away from said second end of said bottom member;
  a metallic blade member comprising:
    a blade of length substantially greater than its height, said blade having a base portion and sharpened portion;
    an anchor portion being a rectangular configuration with a length identical to the length of said blade, height approximately one half of the height of said top member, and width equal to the said base of blade;
    said anchor being in fluid connection to said base of blade;
    a tab extending from juncture of said base and said anchor, said tab having a bore therethough for receiving a screw;
    a second notch removed from said bottom surface of said top member adjacent to said second end of top member, said second notch having a length, a width and a depth of equal proportions to said anchor, said second notch being located such that insertion of said blade member allows said blade to come in contact with said heating element when said top member is forced downward against said spring.

* * * * *